(12) United States Patent
Liang et al.

(10) Patent No.: US 8,084,553 B2
(45) Date of Patent: Dec. 27, 2011

(54) CURABLE ADHESIVE COMPOSITIONS, PROCESS, AND APPLICATIONS

(75) Inventors: Rong-Chang Liang, Cupertino, CA (US); John J. McNamara, El Sobrante, CA (US); Yurong Ying, Sunnyvale, CA (US); Chung-Jen Hou, Pensacola, FL (US)

(73) Assignee: Trillion Science, Inc., Fremont, CA (US)

( * ) Notice: Subject to any disclaimer, the term of this patent is extended or adjusted under 35 U.S.C. 154(b) by 924 days.

(21) Appl. No.: 12/008,375

(22) Filed: Jan. 10, 2008

(65) Prior Publication Data

US 2009/0181165 A1    Jul. 16, 2009

(51) Int. Cl.
C08L 61/34   (2006.01)
C08L 63/00   (2006.01)
C08L 63/02   (2006.01)
C08L 63/04   (2006.01)
H01L 23/29   (2006.01)

(52) U.S. Cl. ............... 525/524; 257/793; 525/328.8; 525/481; 525/504; 525/505; 525/506; 525/507; 525/523; 525/526

(58) Field of Classification Search .......... None
See application file for complete search history.

(56) References Cited

U.S. PATENT DOCUMENTS

| | | | |
|---|---|---|---|
| 2,795,572 A | 6/1957 | Muller | |
| 4,123,450 A | 10/1978 | Weber | |
| 4,833,226 A | 5/1989 | Ishimura | |
| 5,212,044 A | 5/1993 | Liang | |
| 5,219,956 A | 6/1993 | Fukuoka | |
| 5,409,764 A | 4/1995 | Otsuki et al. | |
| 5,543,516 A | 8/1996 | Ishida | |
| 6,207,786 B1 | 3/2001 | Ishida | |
| 6,225,440 B1 | 5/2001 | Ishida | |
| 6,437,026 B1 | 8/2002 | Garrett | |
| 6,743,852 B2 | 6/2004 | Dershem | |
| 6,899,960 B2 | 5/2005 | Shi | |
| 7,179,684 B2 | 2/2007 | Shi | |
| 2002/0002242 A1 | 1/2002 | McNamara et al. | |
| 2002/0082322 A1 | 6/2002 | Hwang et al. | |
| 2004/0006150 A1 | 1/2004 | Murray et al. | |
| 2004/0147640 A1 | 7/2004 | Hwang et al. | |
| 2006/0128835 A1 | 6/2006 | Usui | |
| 2007/0055039 A1 | 3/2007 | Usui | |
| 2007/0149726 A1 | 6/2007 | Sobe et al. | |

FOREIGN PATENT DOCUMENTS

WO    87/05600    9/1987

OTHER PUBLICATIONS

Shriner et al., The Systematic Identification of Organic Compounds, 1980, pp. 348-350, 6th ed., John Wiley & Sons, U.S.A.
Petrie, Epoxy Adhesive Formulations, 2006, pp. 126-127,136, McGraw-Hill publishers, U.S.A.

*Primary Examiner* — Robert Sellers
(74) *Attorney, Agent, or Firm* — Thompson Hine LLP

(57) ABSTRACT

The invention provides an improvement to the useable lifetimes of phenolic-epoxy, phenolic-benzoxazine, phenolic-epoxy-benzoxazine mixtures and other phenolic mixtures through the use of protected phenolics, where a phenolic compound, polymer, or resin is released on demand by the addition of a deblocking agent.

13 Claims, 12 Drawing Sheets

CURABLE ADHESIVE COMPOSITIONS, PROCESS, AND APPLICATIONS

FIELD OF THE INVENTION

This invention relates to adhesives and more specifically to a curable adhesive that contains protected phenolics, small molecules, oligomers, and polymers.

BACKGROUND OF THE INVENTION

Phenolic-epoxy adhesives have been known for over 50 years and were one of the first high temperature adhesives to become commercialized. Once cured, the material retains its adhesive properties over a large range of temperatures, has high shear strengths, and is resistant to weathering, oil, solvents, and moisture. The adhesive is available commercially as either a 1-part adhesive or 2-part adhesive and is available in several forms, such as pastes, solvent solutions, and supported films. Of the three forms, the adhesive film generally provides better adhesive strength In a 1-part adhesive, both phenolic and epoxy are combined by the manufacturer and is available to the consumer as a single component. Although convenient, as no mixing is required by the consumer, the adhesive suffers from a shortened useable lifetime, also known as shelf-life, at room temperature because the highly reactive phenolic immediately initiates the cure chemistry of the epoxy once it is added. This effect is even more pronounced at temperatures above room temperature, where the useable lifetime of the adhesive can be reduced to minutes. In the special case of supported films, the shelf life is so short that films must be stored under refrigerated conditions before use, as described by Petrie in "Epoxy Adhesive Formulations", McGraw-Hill publishers, 2006. In addition, the manufacturer of a 1-part adhesive and can also experience a reduced time to manufacture the adhesive because the phenolic quickly begins to cause an increase in solution viscosity as it starts to react with the epoxy, and, if care is not taken, the viscosity will continue to increase until a point is reached at which the processability is severely compromised.

In a 2-part adhesive, the phenolic and epoxy are separated and supplied by the manufacturer as two distinct packages, which are then combined and mixed by the consumer immediately before use. Because the phenolic and epoxy are kept separate, the adhesive does not suffer from a reduced shelf-life and it is therefore not necessary to store under refrigerated conditions; however, it does have a reduced green time, the time during which after the phenolic and epoxy are mixed the adhesive remains workable. As in the case for the reduced manufacturing time for a 1-part adhesive, the viscosity of a 2-part adhesive continues to increase after the phenolic is combined with the epoxy until a point is reached at which the adhesive gels and begins to set. The consumer therefore, has a finite period of time during which the adhesive remains workable.

Phenolics are also reactive toward benzoxazines and have been used to decrease the polymerization temperature, as demonstrated in U.S. Pat. No. 6,207,786, of Ishida et al., where the polymerization temperature was lowered from 190° C. to 145° C. after the addition of phenol. The phenolic in this case functions as a polymerization initiator, or curative, for benzoxazine, in a similar manner as phenols initiate the cross-link chemistry of epoxies.

U.S. Pat. No. 6,207,786, to Ishida et al. and U.S. Pat. No. 6,437,026 to Garrett have described the use of phenolics to reduce both the cure temperature and cure time when it is used in concert with benzoxazines and epoxies. The resulting thermosetting adhesives have a Tg in excess of 180° C., with lower water uptake and good adhesive properties, desirable properties for applications involving electronics. These inventions have shortened useable lifetimes, as the compositions described contain a combination of phenolics and epoxies, which will start to cure immediately after being added together.

There remains a need to improve the useable lifetime of phenolic-epoxy, phenolic-benzoxazine, and phenolic-epoxy-benzoxazine mixtures whereby the phenolic is a protected phenolic and in the form of an aryl glycidyl carbonate. The phenolic group may be released in controllable ways by for examples heat, radiation, base or acid catalyzed reactions, nucleophilic substitution reactions and combination thereof to facilitate the crosslinking or polymerization of the epoxides and/or benzoxazines. Although other protected phenolics are known, such as aryl alkyl carbamates as described by U.S. Pat. No. 4,123,450 of Weber and WO 87/05600 of Chan, they have distinct disadvantage that for every equivalent of phenolic generated one equivalent of a highly toxic alkyl isocyanate is also created. In many instances, the alkyl isocyante is a gaseous compound that is harmful and detrimental to human health, in addition to performing as a low molecular weight contaminate that is free to migrate and cause a decrease in the performance of the adhesive. In addition, said contaminate would perform as a plasticizer thereby causing an unwanted decrease in $T_g$. In contrast, the only byproducts resulting from the deprotection of aryl glycidyl carbonates are non-toxic $CO_2$ and a reactive epoxy. Unlike the low molecular weight contaminate just described, the advantage of a reactive epoxy as a byproduct is that is becomes incorporated into the adhesive matrix during the curing process and it would therefore not cause a decrease in $T_g$ nor adversely affect the performance of the adhesive The mixtures described above would have benefit in composites, molding compounds, adhesives and coatings, particularly for electronic applications, which include, but are not limited to underfill materials, electronic packaging, encapsulation, die attach adhesives, conductive adhesives, lead free solders, anisotropic conducting films (ACFs) and non-adhesive conductive films (NCFs). Said compositions would find benefit in electronic displays, circuit boards, flip chip, and other semiconductor devices.

SUMMARY OF THE INVENTION

It is therefore an object of the invention to provide an improvement to the useable lifetimes of phenolic-epoxy, phenolic-benzoxazine, phenolic-epoxy-benzoxazine mixtures and other phenolic mixtures through the use of protected phenolics, where a phenolic compound, polymer, or resin is released on demand by the addition of a deblocking agent.

One desirable composition consists of from 0.1 to 90 weight percent of a protected phenolic and 0.1 to 90 weight percent of an epoxy. The composition can be used with 0.1 to 40 weight percent of a deblocking agent to facilitate the release of the phenolic. In addition, the composition can contain one or more of 0.1 to 20 weight percent of fillers, 0.1 to 20 weight percent of adhesion promoters, 0.1 to 20 weight percent of silane coupling agents, 0.1 to 20 weight percent pigments, 0.1 to 20 weight percent dyes, and 0.1 to 20 weight percent electrically conducting particles.

Another desirable composition consists of from 0.1 to 90 weight percent of a protected phenolic and 0.1 to 90 weight percent of a benzoxazine. The composition can be used with 0.1 to 40 weight percent of a deblocking agent to facilitate the release of the phenolic. In addition, the composition can contain one or more of 0.1 to 20 weight percent of fillers, 0.1 to 20 weight percent of adhesion promoters, 0.1 to 20 weight percent of silane coupling agents, 0.1 to 20 weight percent pigments, 0.1 to 20 weight percent dyes, and 0.1 to 20 weight percent electrically conducting particles.

Yet another desirable composition consists of from 0.1 to 90 weight percent of a protected phenolic, 0.1 to 90 weight percent of a epoxy, and 0.1 to 90 weight percent of a benzoxazine. The composition can be used with 0.1 to 40 weight percent of a deblocking agent, to facilitate the release of the phenolic. In addition, the composition can contain one or more of 0.1 to 20 weight percent of fillers, 0.1 to 20 weight percent of adhesion promoters, 0.1 to 20 weight percent of silane coupling agents, 0.1 to 20 weight percent pigments, 0.1 to 20 weight percent dyes, and 0.1 to 20 weight percent electrically conducting particles.

BRIEF DESCRIPTION OF THE DRAWINGS

The invention is generally shown by way of reference to the accompanying drawings.

DETAILED DESCRIPTION OF THE INVENTION

The preferred embodiment and additional embodiments are described in detail with reference to the related drawings. Further embodiments, features and advantages will become apparent from the ensuing description or may be learned by practicing the invention. The following description of embodiments is not to be taken in a limiting sense, but is made merely for the purposes of describing the general principles of the invention.

Protected Phenols

Figure 1:
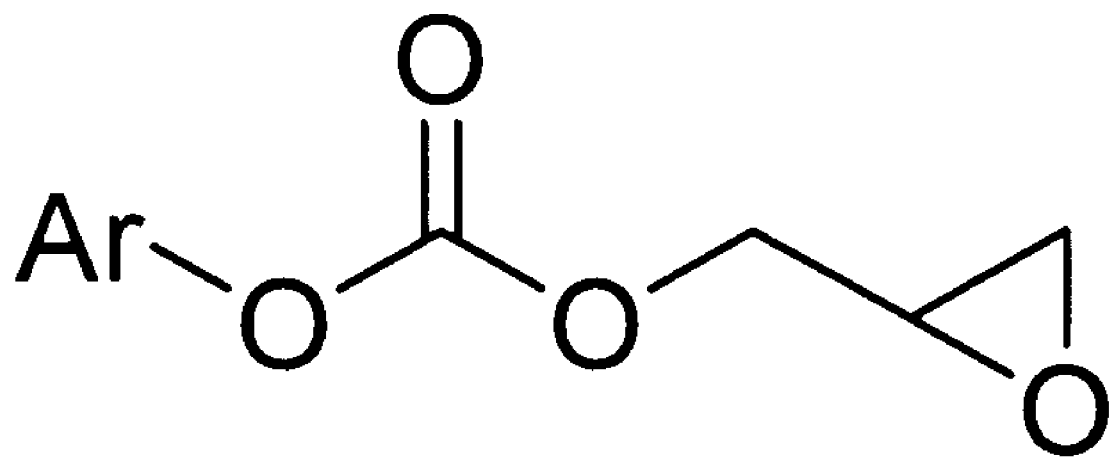
FIG. 1 depicts an example of an aryl glycidyl carbonate.

The protected phenolics described herein refer to any phenolic compound that has been converted to an aryl glycidyl carbonate as shown in FIG. 1.

Figure 2:
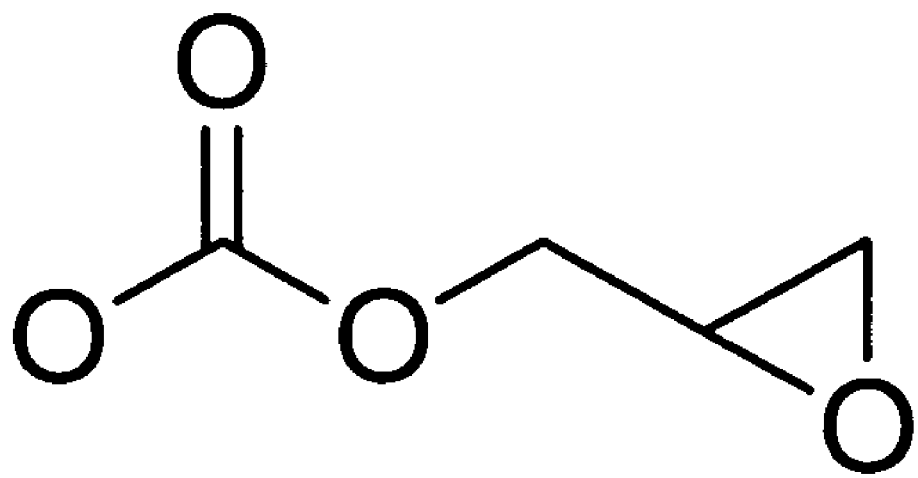
FIG. 2 depicts a glycidyl carbonate functional group.

The protected phenol can contain one or more glycidyl carbonate functional groups, where the glycidyl carbonate is defined according to FIG. 2.

Figure 3:
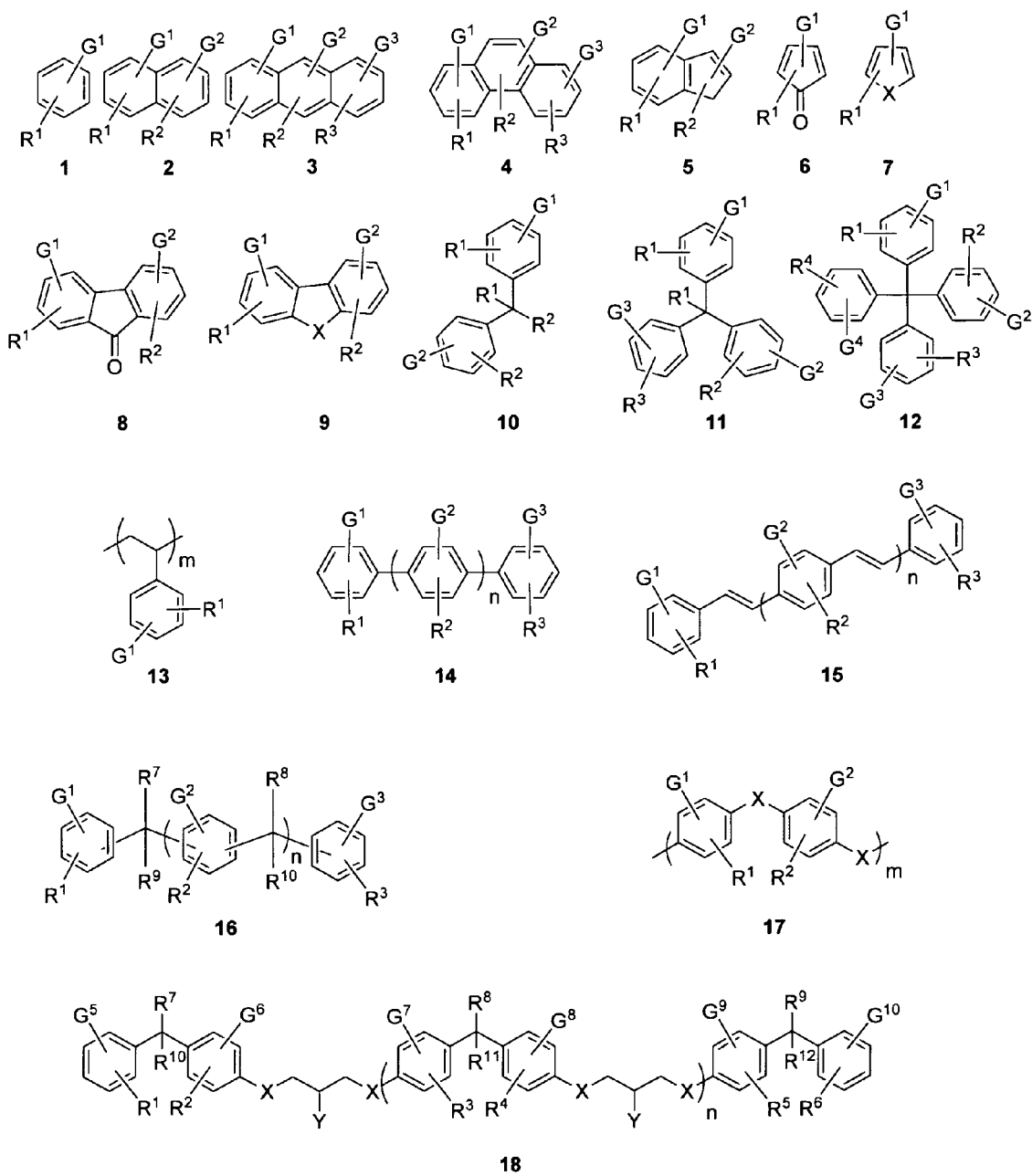
FIG. 3 depicts possible chemical structures for the aryl glycidyl carbonates shown in FIG. 1.

The aryl glycidyl carbonate shown in FIG. 1 includes, but is not limited to, the chemical structures shown in FIG. 3, where $G^1$ is one or more glycidyl carbonate groups shown in FIG. 2; $G^2$, $G^3$, $G^4$, $G^5$, $G^6$ are H and one or more glycidyl carbonate groups shown in FIG. 2; $R^1$, $R^2$, $R^3$, $R^4$, $R^5$, $R^6$ are one or more H, F, Cl, Br, I, $CH_3$, alkane, alkene, alkyne, any structure shown in FIG. 6, $OR^3$, $OAr^1$, $CO_2R^3$, $CO_2Ar^1$, $C(O)NHR^{13}$, $C(O)NHAr^1$, $C(O)NR^{13}R^{14}$, $C(O)NAr^1Ar^2$, $OC(O)R^{13}$, $OC(O)Ar^1$, $NHC(O)R^{13}$, $NHC(O)Ar^1$, $NR^{13}C(O)R^{14}$, $NAr^1C(O)R^{13}$, $NAr^1C(O)Ar^2$, $SR^1$, $SAr^1$, where $R^{13}$ and $R^{14}$ are $CH_3$, alkane, alkene, alkyne; $Ar^1$ and $Ar^2$ are any aromatic chemical moiety or any heterocyclic chemical moiety; $R^7$, $R^8$, $R^9$, $R^{10}$, $R^{11}$, $R^{12}$ are H, $CH_3$, alkane, alkene, alkyne; X is $CH_2$, O, S, NH, $NR^{13}$, $NAr^1$; Y is H, OH, and any structure shown in FIG. 6; n is an integer greater than or equal to zero; m is an integer greater than or equal to one. The chemical structures 13 through 18 can have linear, hyperbranced, or dendritic configurations, or combinations thereof, which are known to those skilled in the art.

In addition, one or more of the $sp^2$-hybridized carbon atoms of the chemical structures shown in FIG. 3 can be replaced with N, P, or combinations thereof.

Figure 4:
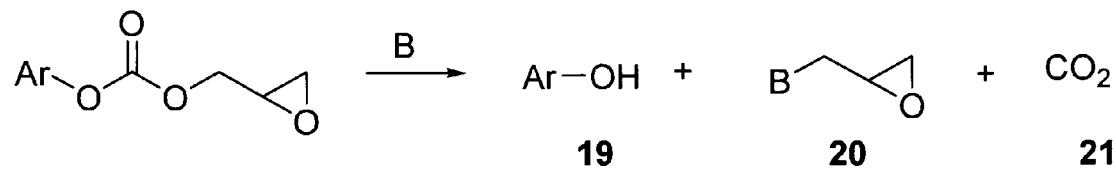
FIG. 4 depicts Scheme 1 for deprotection of a protected phenol.

FIG. 4 depicts Scheme 1, where the deprotection of the glycidyl carbonate is caused by the addition of a deblocking agent B and where the deblocking agent reacts either directly or indirectly with the oxirane thereby releasing the phenolic (19), in addition to oxirane (20), and carbon dioxide, (21). This could be accomplished by various theories.

The deblocking agent can be a catalyst or curing agent of the type used to accelerate the cure rate of epoxy-based adhesives, such as alkyl amines, aromatic amines, imidazoles, triazoles, triazines, melamines, other classes of heterocyclic amines, amine-containing siloxanes, amine-epoxy adducts, imidiazole-epoxy adducts, mercaptans, alkoxides, hydroxides, or combinations thereof. In addition, boron halides, aluminum halides, titanium halides, and other Lewis acids could be added to assist with the ring-opening of the oxirane and thereby initiate the release of the phenolic.

The deblocking agent can also be a latent catalyst, as described in U.S. Pat. No. 4,833,226 of Ishimura et al, U.S. Pat. No. 5,219,956 of Fukuoka, US 2006/0128835 and US 2007/0055039 of Usui et al., where an amine containing compound or amine-epoxy adduct is encapsulated within a polymeric material and said catalyst is released on demand through the use of an external stimulus, such as heat, pressure, solvent, plasticizer, or a combination thereof.

The protected phenolics described above can also perform as a source for the controlled release of phenolics. The phenols thus released may consequently be used as for examples, developers or inhibitors for applications including, but are not limited to, development of silver halides for imaging applications, inhibition of radical polymerization or redox reactions, and antioxidation. As needed, the deblocking agent can be added all at once or metered at a rate that is commensurate to accommodate the release rate of the phenolic as desired by the end-user. Substituting the Ar—O of the carbonate as depicted in FIG. 4 (Scheme 1) with Ar—S, Ar—NH, Ar—NAr, or Ar—NR would also be useful as sources for the controlled release of aryl mercaptans and aryl amines.

Figure 5:
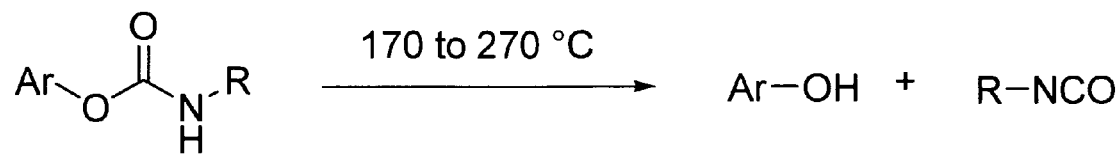
FIG. 5 depicts Scheme 2 for pyrolysis of aryl alkyl carbamates.

FIG. 5 depicts Scheme 2, where, in addition to aryl glycidyl carbonates, another source for the controlled release of phenolics can result from the thermal decomposition of aryl alkyl carbamates as described by U.S. Pat. No. 4,123,450 of Weber and WO 87/05600 of Chan. In many instances, the alkyl isocyante is a gaseous compound that is harmful and detrimental to human health. In contrast, the only byproducts for the release of the phenolics using aryl glycidyl carbonates (Scheme 1) is $CO_2$ and an epoxy, where said epoxy is considerably less volatile and less toxic than the corresponding alkyl isocyanate and has the additional advantage of becoming incorporated into the adhesive, composite matrix, or coating.

Epoxies

Figure 6:
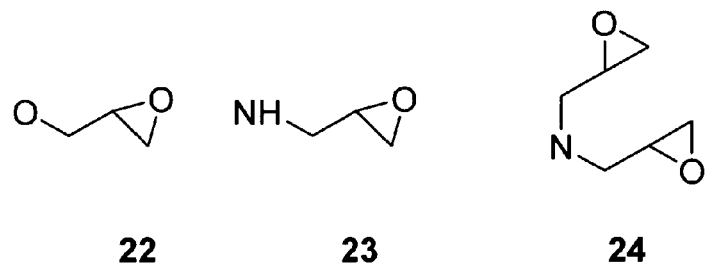
FIG. 6 depicts the chemical structure of oxirane moieties.

The epoxies described herein refer to the chemical structures of FIG. 3, where $G^1$ is one or more of the chemical structures shown in FIG. 6; $G^2, G^3, G^4, G^5, G^6$ are H and one or more of the chemical structures shown in FIG. 6; $R^1, R^2, R^3, R^4, R^5, R^6$ are one or more H, F, Cl, Br, I, $CH_3$, alkane, alkene, alkyne, $OR^{13}$, $OAr^1$, $CO_2R^{13}$, $CO_2Ar^1$, $C(O)NHR^{13}$, $C(O)NHAr^1$, $C(O)NR^3R^4$, $C(O)NAr^1Ar^2$, $OC(O)R^{13}$, $OC(O)Ar^1$, $NHC(O)R$ $NHC(O)Ar$, $NR^{13}C(O)R^{14}$, $NAr^1C(O)R^{13}$, $NAr^1C(O)Ar^2$, $SR^{13}$, $SAr^1$, where $R^{13}$ and $R^{14}$ are $CH_3$, alkane, alkene, alkyne, $Ar^1$ and $Ar^2$ are any aromatic chemical moiety or any heterocyclic chemical moiety; $R^7, R^8, R^9, R^{10}, R^{11}, R^{12}$ are H, $CH_3$, alkane, alkene, alkyne; X is $CH_2$, O, S, NH, $NR^{13}$, $NAr^1$; Y is H, OH, and the chemical structures shown in FIG. 6; n is an integer greater than or equal to zero; m is an integer greater than or equal to one. The chemical structures 13 through 18 can have linear, hyperbranced, or dendritic configurations, or combinations thereof, which are known to those skilled in the art.

Benzoxazine

Benzoxazines are heterocyclic compounds that when polymerized exhibit good heat resistance, low water absorption, little outgassing, low dielectric constants, and exhibit little shrinking, which is what makes them attractive for electronic applications. The polymerization can be initiated cationically through the use of catalysts as described in U.S. Pat. No. 6,899,960 and U.S. Pat. No. 7,179,684 of Shi et al. and U.S. Pat. No. 6,225,440 of Ishida. Benzoxazines are also known to undergo thermally initiated polymerizations at high temperatures (150 to 300° C.). We have found unexpectedly that this temperature can be reduced when a benzoxazine is heated in the presence of a protected phenolic, as shown in Table 4 (below).

Figure 7:
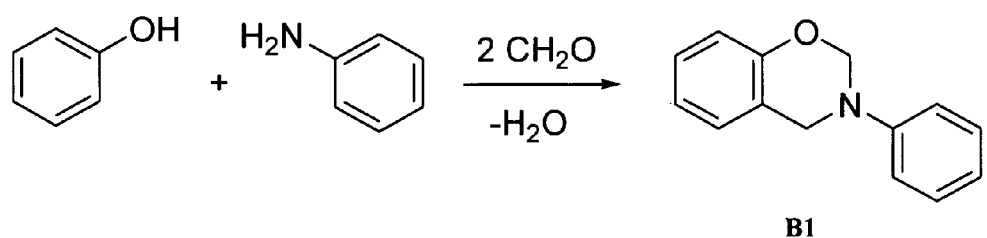
FIG. 7 depicts an example of the synthesis of a simple benzoxazine.

Benzoxazines are synthesized from phenols using the Mannich reaction, with at least one position ortho to the phenolic hydroxyl is unsubstituted, as described in GB 694,480 of Lane, U.S. Pat. No. 5,543,516 of Ishida, and U.S. Pat. No. 6,743,852 of Dershem. A representation of a simple benzoxazine (B1) is shown in FIG. 7.

Figure 8A:
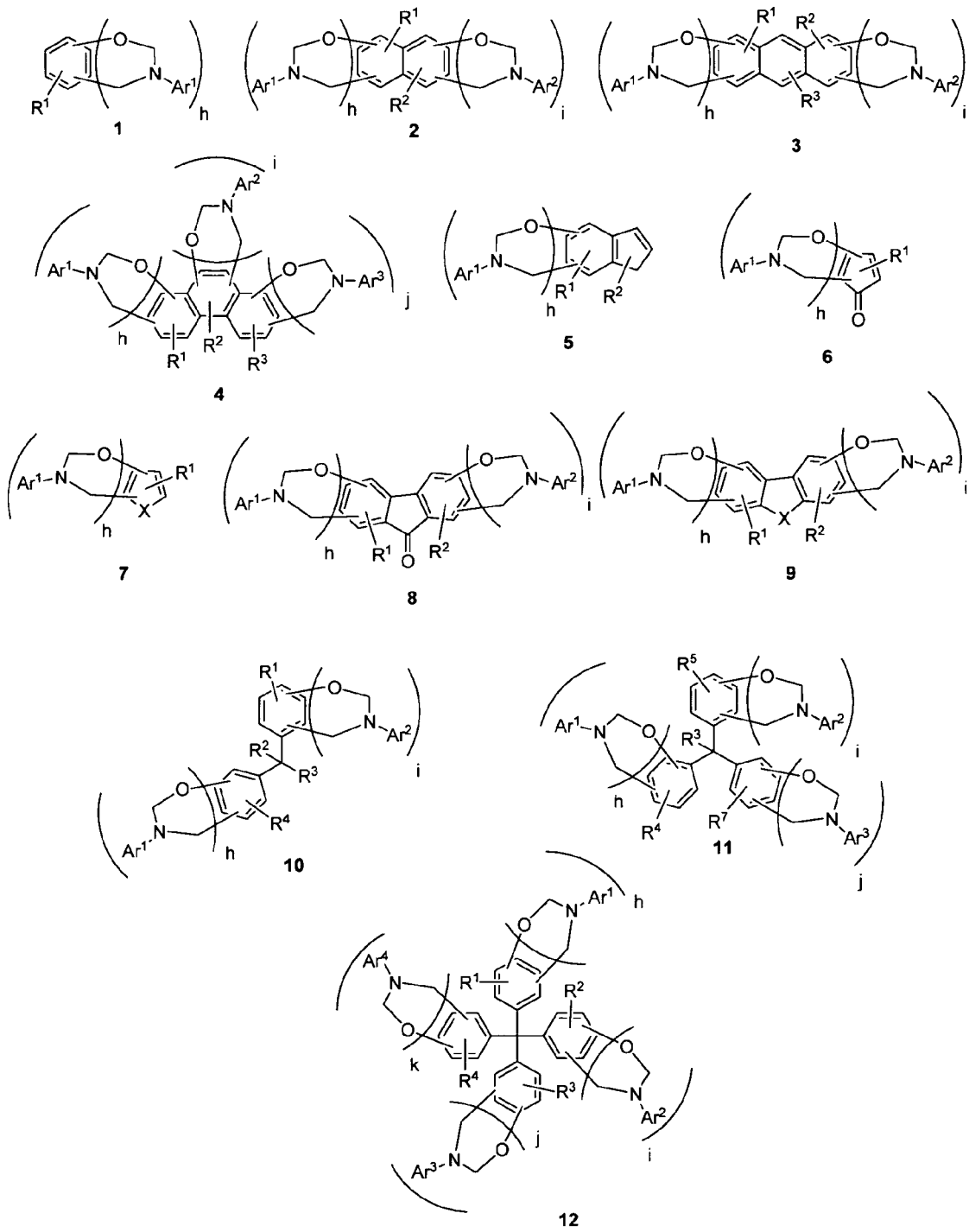
FIGS. 8A and 8B depict possible chemical structures for benzoxazines.
Figure 8B:
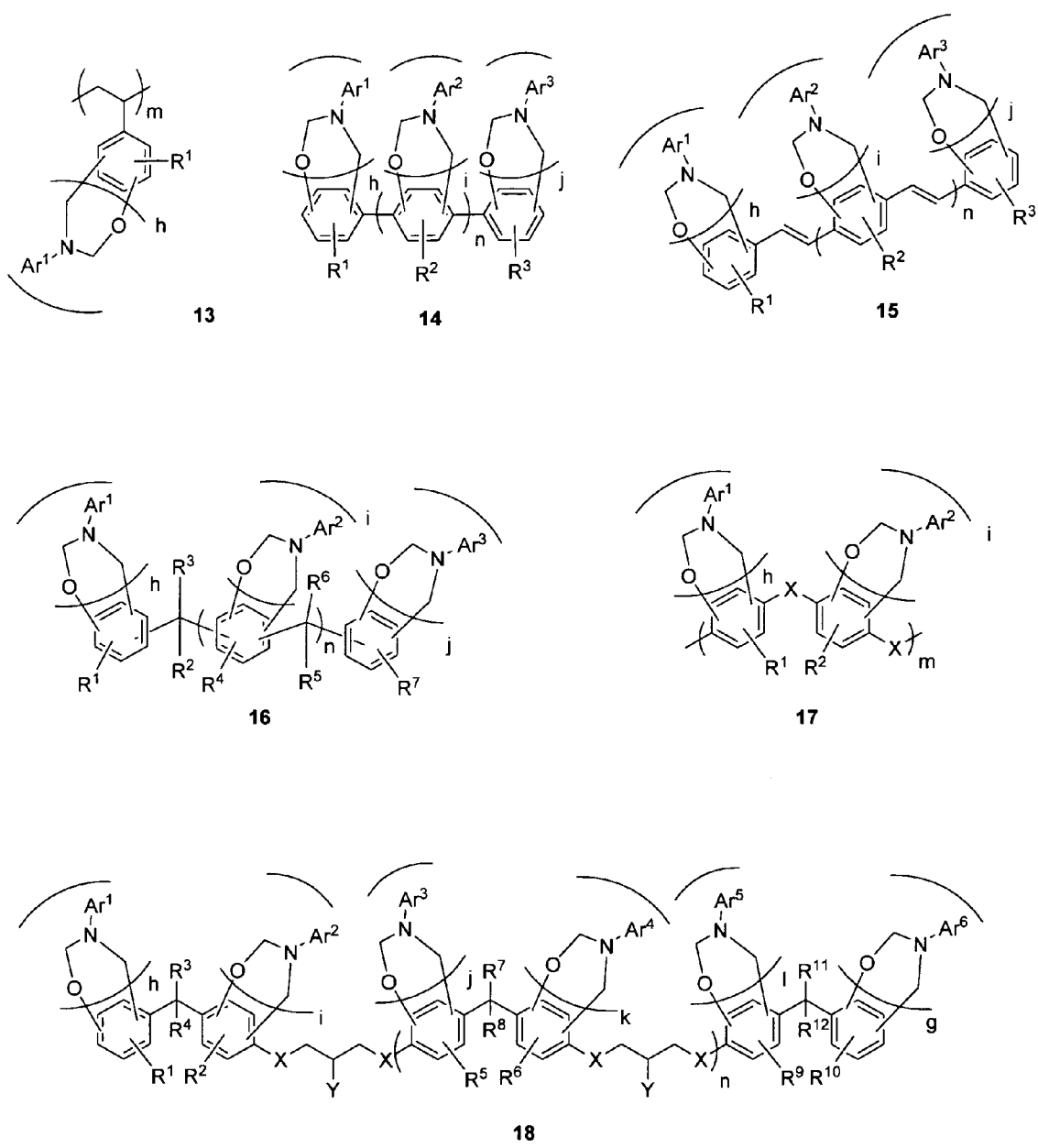

The benzoxazines for one embodiment of the invention have one or more benzoxazine moieties attached at two adjacent $sp^2$-hybridized carbon atoms of an aromatic compound. The benzoxazines can include, but are not limited to, the chemical structures of FIGS. 8A and 8B, where $Ar^1, Ar^2, Ar^3, Ar^4, Ar^5$, and $Ar^6$ are benzene, toluene, or any aromatic compound; $R^1, R^2, R^3, R^4, R^5, R^6, R^7, R^8, R^9, R^{10}, R^{11}$, and $R^{12}$ are one or more H, $CH_3$, any alkane, alkene, or alkyne; X and Y are N—H, N—R, where R is any alkane, N—Ar, where Ar is benzene, toluene, or any aromatic compounds, S, or O; h is an integer 1 or 2; g, i, j, k, l are integers 0, 1, or 2; n is an integer greater than or equal to 0; m is an integer greater than or equal to 1.

Fillers

The fillers can include, but are not limited to glass fibers, cellulose fibers, wood or bamboo chips, silica, alumina, talcs (magnesium silicate), barites (barium sulfate), clays (aluminum silicate), calcium carbonate, boron nitride, silicone nitride, aluminum nitride, and titanium dioxide.

Coupling Agents

Coupling agents may be used to improve the wet adhesion and performances in high humidity environment. Useful coupling agents for the present invention include, but are not limited to, glycidoxypropyltimethoxysilane, glycidoxypropyltiethoxysilane, γ-aminopropyltriethoxysilane, γ-aminopropyltrimethoxysilane, vinyltriethoxysilane, vinyltrimethoxysilane, acryloxypropyltriethoxysilane, acryloxypropyltrimethoxysilane, and γ-mercaptopropyltrimethoxysilane. Among these, the coupling agents having amino or oxirane functional groups are preferred for electronics. Titanate or zirconate coupling agents may also be used particularly when fillers having no metal oxide or hydroxide functionality on the surface are employed.

Electrically or Thermally Conducting Particles or Fibers

The electrically or thermally conducting particles can include, but are not limited to, carbon, nano tubes of carbon, graphite, and composites or blends comprising Zn, Al, Sb, Au, Ag, Sn, Fe, Cu, Pb, Ni, and Pt metals or metal oxides, and conductive particles having a polymeric or inorganic core and a metallic shell.

EMBODIMENT FOR WORKABLE LIFETIME

The workable lifetime of the invention is described as a period of time in which during preparation of the composition, also known as the pot life, the composition is still able to be processed into an adhesive. The workable lifetime is further described as a period of time, after the composition has been processed, assembled, and ready for use, it maintains its ability to function as an adhesive.

EXAMPLES

Protected Phenolics

Example 1

Synthesis of Glycidyl Chloroformate (P1)

Figure 9:
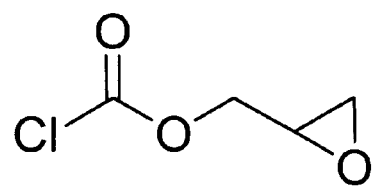
FIG. 9 depicts Example 1 regarding a protected phenolic.

The chloroformate P1 was prepared according to U.S. Pat. No. 2,795,572, Muller et al.; with the exception that phosgene was replaced with triphosgene. See FIG. 9.

Example 2

Synthesis of Phenyl Glycidyl Carbonate (P2)

Figure 10:
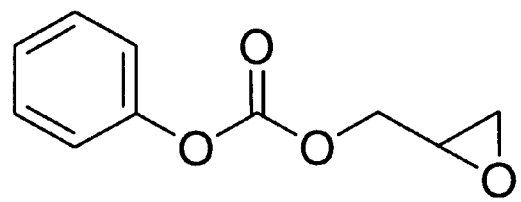
FIG. 10 depicts Example 2 regarding a protected phenolic.

A three-necked round bottom flask, equipped with a reflux condenser, an addition funnel, and a nitrogen gas inlet is charged with 25.00 g (0.160 mole) of phenyl chloroformate and 70 g of THF. The reactor was placed in a 0° C. bath and purged with nitrogen. After 30 minutes, a solution of 13.00 g (0.175 mole) glycidol, 19.50 g (0.193 mole) triethylamine, and 75 g of anhydrous tetrahydrofuran (THF) was added drop wise over the course of one hour, after which the reaction was allowed to warm to room temperature and allowed to stir overnight under a nitrogen atmosphere. The contents of the reactor were discharged, filtered, and evaporated to dryness to afford 29.51 g of crude product, which was purified by flash chromatography using silica gel and eluted with a 1:1 solution of iso-propyl acetate and hexane. See FIG. 10.

Example 3

Synthesis of Diglycidyl Bisphenol a Dicarbonate (P3)

Figure 11:
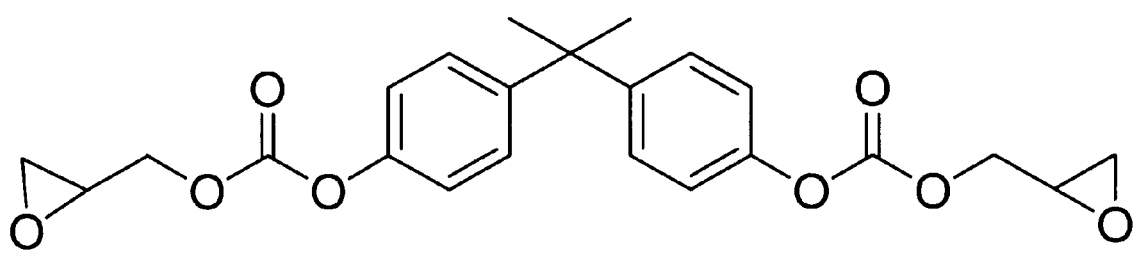
FIG. 11 depicts Example 3 regarding a protected phenolic.

The dicarbonate P3 was obtained from 18.10 g (0.0501 mole) of bisphenol-A bis(chloroformate) and 7.17 g (0.0968 mole) of glycidol using the procedure of Example 2 to afford 20.98 g of crude product, which was purified by dissolving the crude material in toluene and extracting with 0.1 N NaOH, followed by 0.1 N HCl, and finally with water and brine. The toluene layer was dried over $MgSO_4$, filtered, and evaporated to dryness. See FIG. 11.

Example 4a

Synthesis of Diglycidyl 4,4'-cyclohexylidenebisphenol Dicarbonate (P4)

Figure 12:
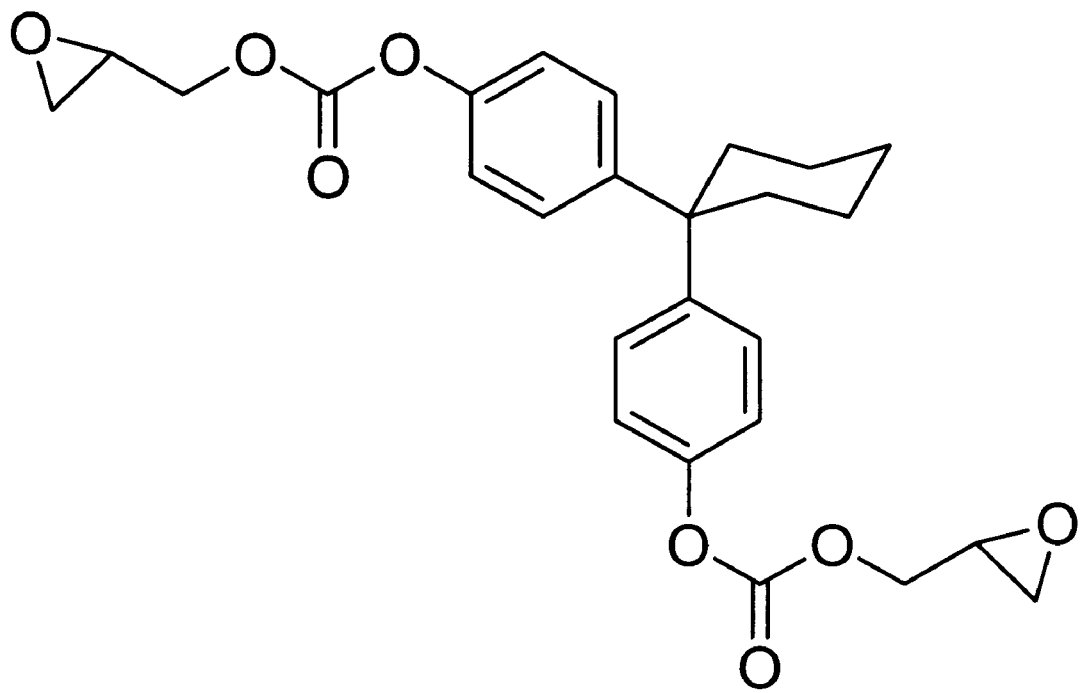
FIG. 12 depicts Examples 4a and 4b regarding a protected phenolic.

The dicarbonate P4 was synthesized from 23.45 g (0.0596 mole) of 4,4'-cyclohexylidenebisphenol bis(chloroformate) and 8.65 g (0.168 mole) glycidol according to the procedure of Example 2 to afford 27.72 of crude material, which was purified according to Example 3. See FIG. 12.

Example 4b

Alternate Synthesis of P4

A three-necked round bottom flask equipped with a reflux condenser, an addition funnel, and inert gas inlet, is purged with nitrogen, and charged with 13.50 g (0.100 mole) P1 and 120 mL anhydrous THF. The temperature of the reaction was reduced to −3° C. and a solution of 13.42 g (0.0500 mole) 4,4'-cyclohexylidenebisphenol, 10.12 g triethylamine, and 80 mL of anhydrous tetrahydrofuran was added drop-wise over the course of one hour. The reaction was allowed to warm to room temperature and allowed to stir under a nitrogen atmosphere overnight. The reaction is filtered and evaporated to dryness to afford 22.25 g of crude material that was purified by dissolving in toluene and extracted once with 0.1 N NaOH, followed by 0.1N HCl, water, and brine. The organic layer was dried over $MgSO_4$, filtered, and evaporated to dryness.

Example 5a

Synthesis of Diglycidyl 4,4'-[9-fluorenylidene]diphenol Dicarbonate (P5)

Figure 13:
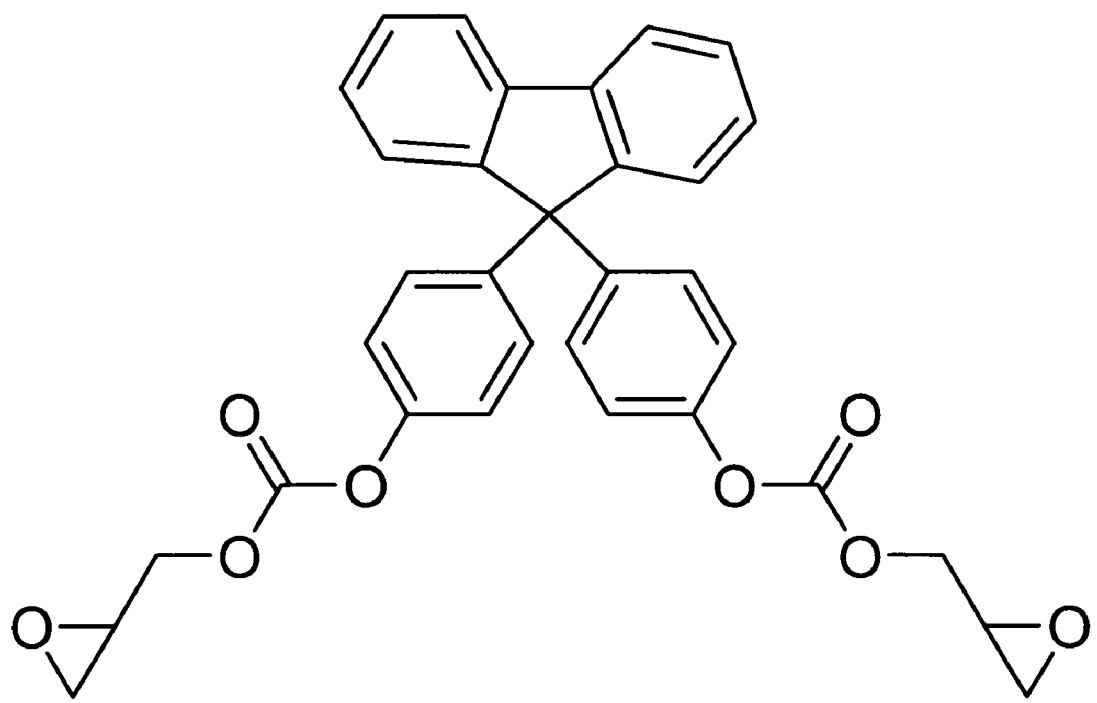
FIG. 13 depicts Examples 5a and 5b regarding a protected phenolic.

The dicarbonate P5 was synthesized from 25.67 g (0.0540 mole) 4,4'-(9-fluorenylidene)diphenol bis(chloroformate) and 7.84 g (0.106 mole) of glycidol using the procedure of Example 2 to afford 26.75 g of crude material, which was purified according to Example 3. See FIG. 13.

Example 5b

Alternate Synthesis of Diglycidyl 4,4'-[9-fluorenylidene]diphenol Dicarbonate

The dicarbonate P5 was also synthesized from 10.52 g (0.0300 mole) 4,4'-(9-fluorenylidene)diphenol and 8.16 g (0.0600 mole) P1 and afforded 15.42 g of crude material using to the procedure of Example 4b.

Example 6

Synthesis of Triglycidyl 1,1,1-tris(4-hydroxyphenyl)ethane Tricarbonate (P6)

Figure 14:
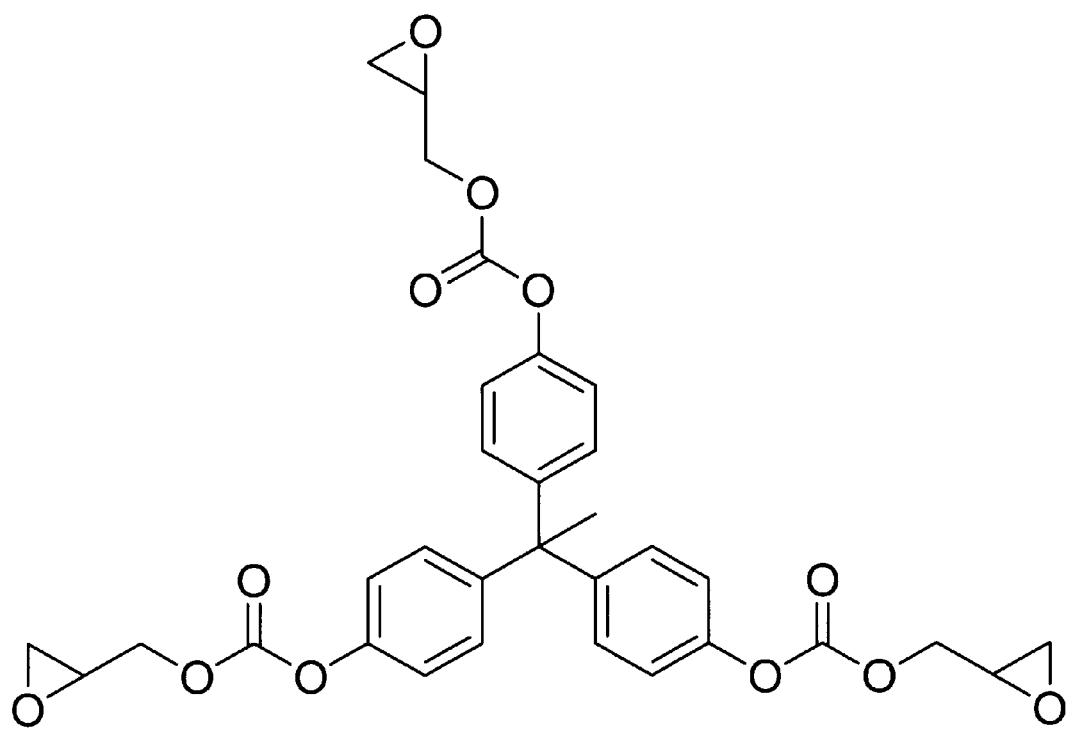
FIG. 14 depicts Example 6 regarding a protected phenolic.

The tris(carbonate) P6 was synthesized from 13.76 g (0.0449 mole) 1,1,1-tri(4-hydroxyphenyl)ethane and 18.40 g (0.135 mole) P1 and afforded 23.15 g of crude material according to the procedure of Example 4b. See FIG. 14.

Example 7

Synthesis of Diglycidyl 4,4'-biphenylcarbonate (P7)

Figure 15:
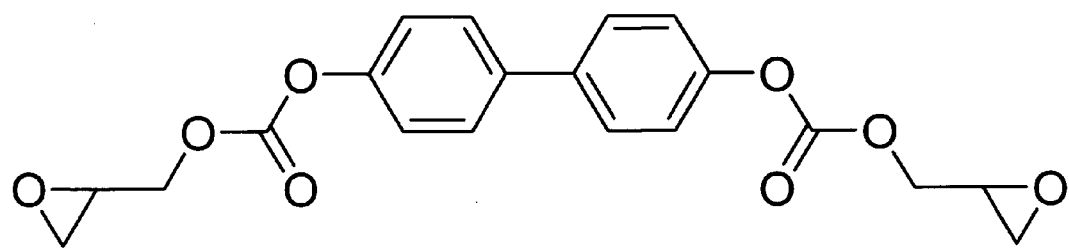
FIG. 15 depicts Example 7 regarding a protected phenolic.
Figure 16:
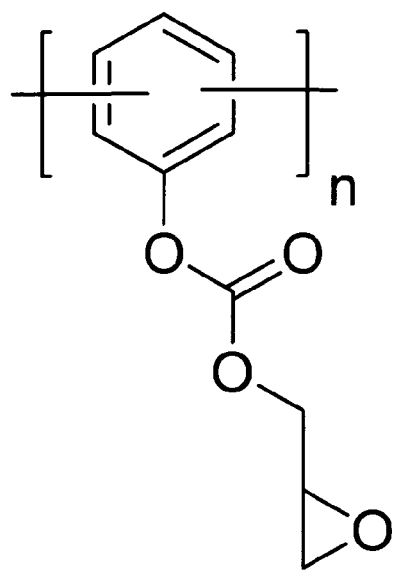
FIG. 16 depicts Example 8 regarding a protected phenolic.

The dicarbonate P7 is synthesized from 38.6 g (0.100 mole) of 4,4-dihydroxybiphenyl, 27.32 g (0.200 mole) of P1, and 200 mL of anhydrous THF according to the procedure of Example 4b. See FIG. 15.

Example 8

Synthesis of Poly(glycidyl phenyl carbonate) (P8)

Polyphenol is synthesized from the polymerization of phenol using horseradish peroxidase according to U.S. Pat. No. 5,212,044 of Liang, et al. Using the procedure of Example 4b, the poly(glycidyl carbonate) P8 is synthesized 15.00 g (0.100 mole) of polyphenol, 13.66 g (0.100 mole) of P1, and 200 mL of anhydrous THF.

Benzoxazines

The synthesis of the benzoxazines were performed according to GB 694,489, of Lane, with the exception that dioxane was replaced with methyl ethyl ketone (MEK).

Example 9

Synthesis of Benzoxazine from Phenol and Aniline (B1)

Figure 17:
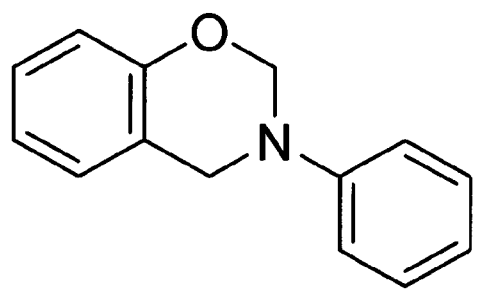
FIG. 17 depicts Example 9 regarding a benzoxazine.

Phenol (11.29 g, 0.12 mole), paraformaldehyde (7.21 g, 0.24 mole), and MEK are combined and while stirring, aniline (11.17 g, 0.12 mole) is added and the mixture heated to 120° C. using a hot plate. During the reaction, MEK and water are allowed to evaporate. The mixture is allowed to equilibrate to room temperature. See FIG. 17.

Example 10

Synthesis of Benzoxazine from Bisphenol-A and Aniline (B2)

Figure 18:
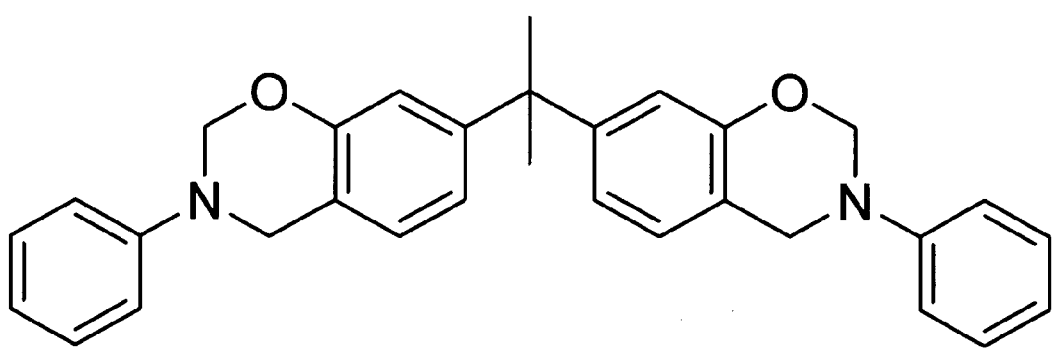
FIG. 18 depicts Example 10 regarding a benzoxazine.

Bisphenol A (27.39 g, 0.12 mole) and paraformaldehyde (14.40 g, 0.48 mole), and MEK were added to a 400-mL beaker. While stirring, aniline (22.37 g, 0.24 mole) was added and the mixture heated to 120° C. using a hot plate. During the reaction, MEK and water were allowed to evaporate producing a yellow and viscous mass. The mixture was allowed to equilibrate to room temperature at which point it solidified to afford 52.74 g (95.0% yield) of a colored solid. See FIG. 18.

Example 11

Synthesis of Benzoxazine from on 4,4'-cyclohexylidenebisphenol and Aniline (B3)

Figure 19:
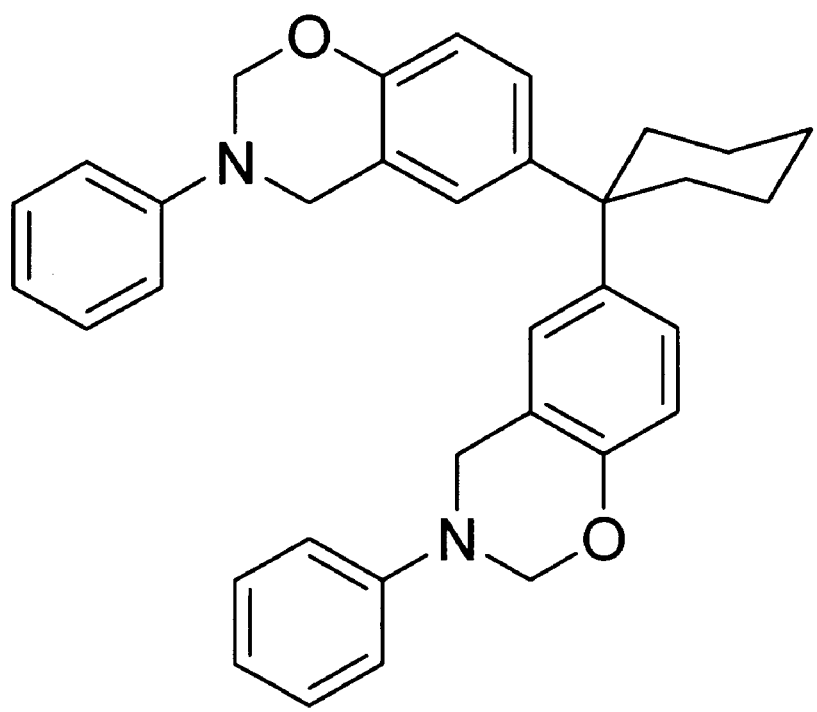
FIG. 19 depicts Example 11 regarding a benzoxazine.

Benzoxazine B3 was synthesized from 13.42 g (0.05 mole) 4,4'-cylcohexylidenebisphenol, 6.00 g (0.2 mole) paraformaldehyde, and 9.31 g (0.1 mole) aniline and afforded 24.0 g (95.5% yield) of a colored solid, using the procedure described in Example 10. See FIG. 19.

Example 12

Synthesis of Benzoxazine from 4,4'-[9-fluorenylidene]diphenol (B4) and Aniline

Benzoxazine B4 was synthesized from 17.52 g (0.05 mole) 4,4'-(9-fluorenylidene)diphenol, 6.00 g (0.2 mole) paraformaldehyde, and 9.31 g (0.1 mole) of aniline, using the procedure described in Example 10 and afforded 28.06 g (96.0% yield) of a colored solid. See FIG. 20.

Example 13

Synthesis of Benzoxazine from Poly(p-Hydroxystyrene) and Aniline (B5)

Figure 21:
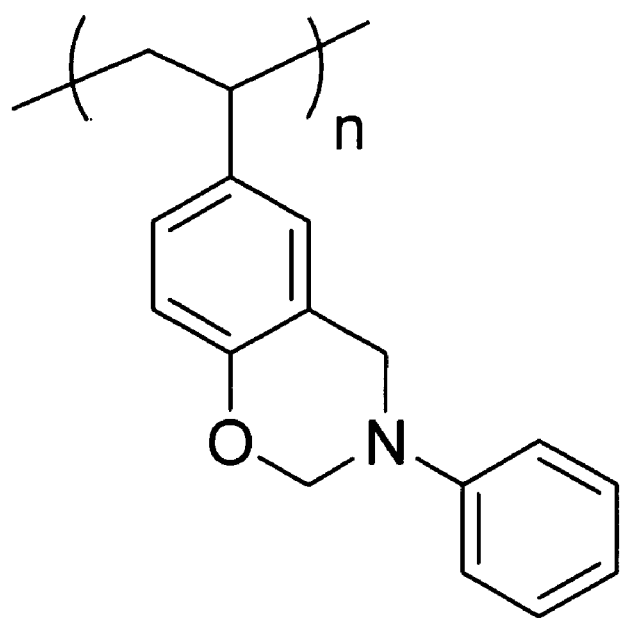
FIG. 21 depicts Example 13 regarding a benzoxazine.

Polybenzoxazine B5 was synthesized from 6.0 g (0.05 mole) Poly(4-vinylphenol, 3.0 g (0.1 mole) paraformaldehyde, and 4.68 g (0.05 mole) aniline according to the procedure described in Example 10 and afforded 11.4 g, (96.0% yield) of a colored solid. See FIG. 21.

Example 14

Synthesis of Benzoxazine from 4,4'-dihydroxybiphenyl and Aniline

Figure 22:
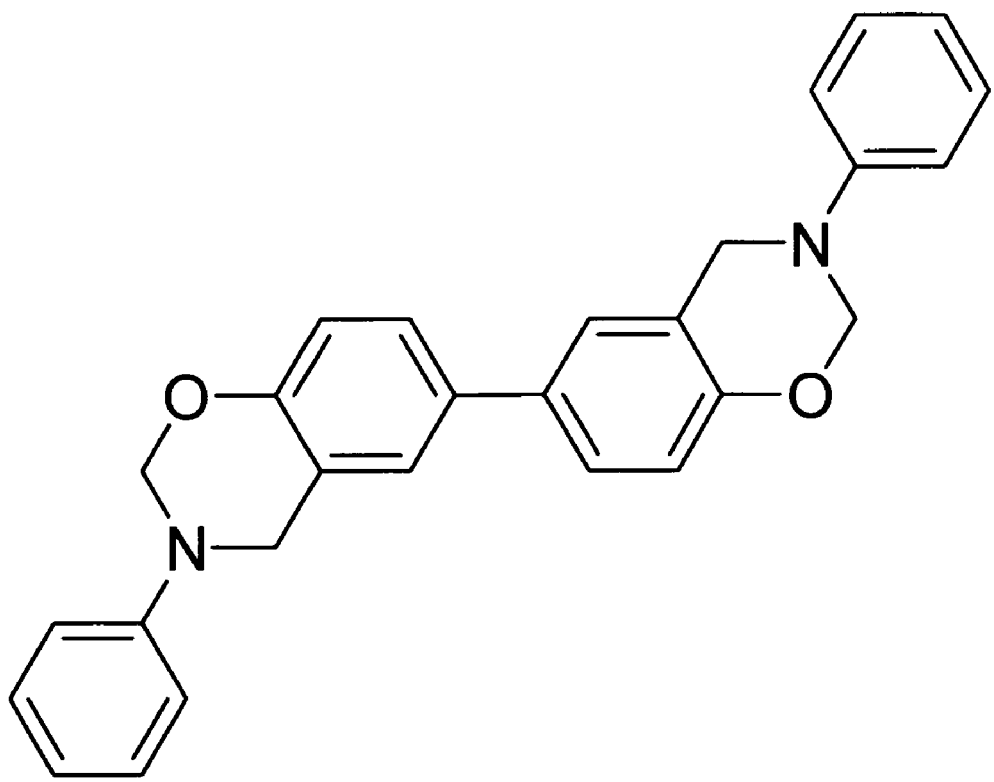
FIG. 22. depicts Example 14 regarding a benzoxazine.

Benzoxazine B6 is synthesized from 18.6 g (0.100 mole) of 4,4-dihydroxybiphenyl, 12.00 g (0.400 mole) paraformaldehyde, and 18.62 g (0.200 mole) of aniline according to the procedure of Example 10. See FIG. 22.

Example 15

Synthesis of Benzoxazine from Polyphenol and Aniline

Figure 23:
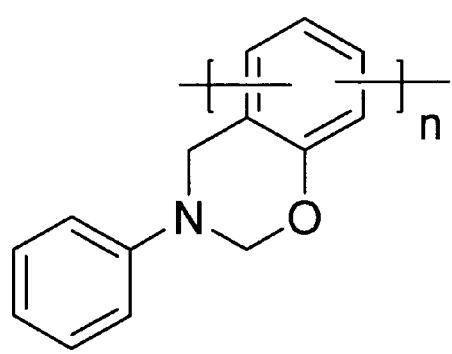
FIG. 23 depicts Example 15 regarding a benzoxazine.
Figure 24:
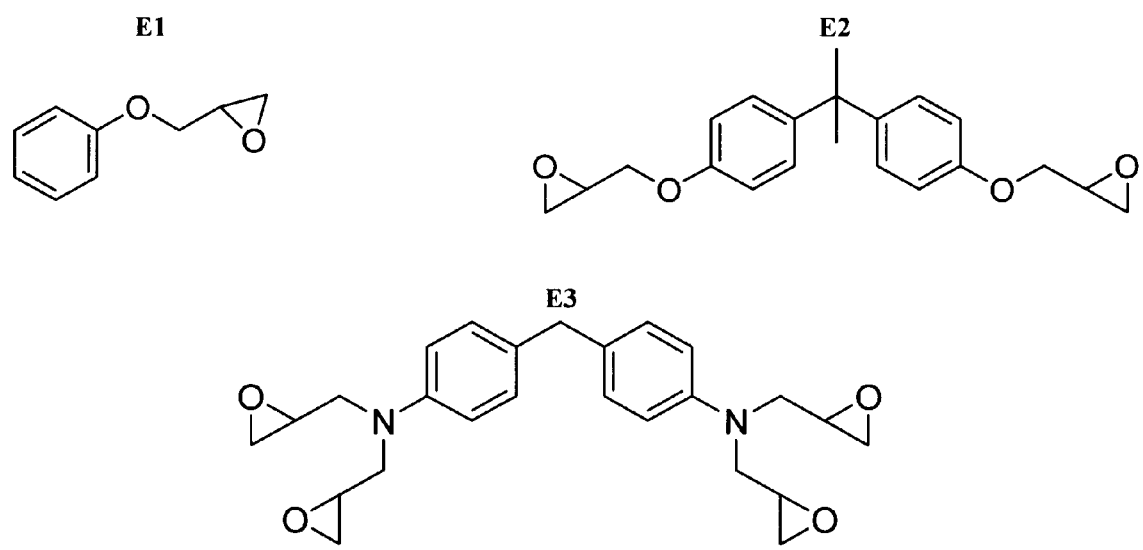
FIG. 24 depicts Example 16 regarding epoxies.

Polybenzoxazine B7 is synthesized from 15.00 g (0.100 mole) of polyphenol, 12.00 g (0.400 mole) paraformaldehyde, and 18.62 g (0.200 mole) of aniline according to the procedure of Example 10. See FIG. 23.
Epoxies

Example 16

Figure 20:
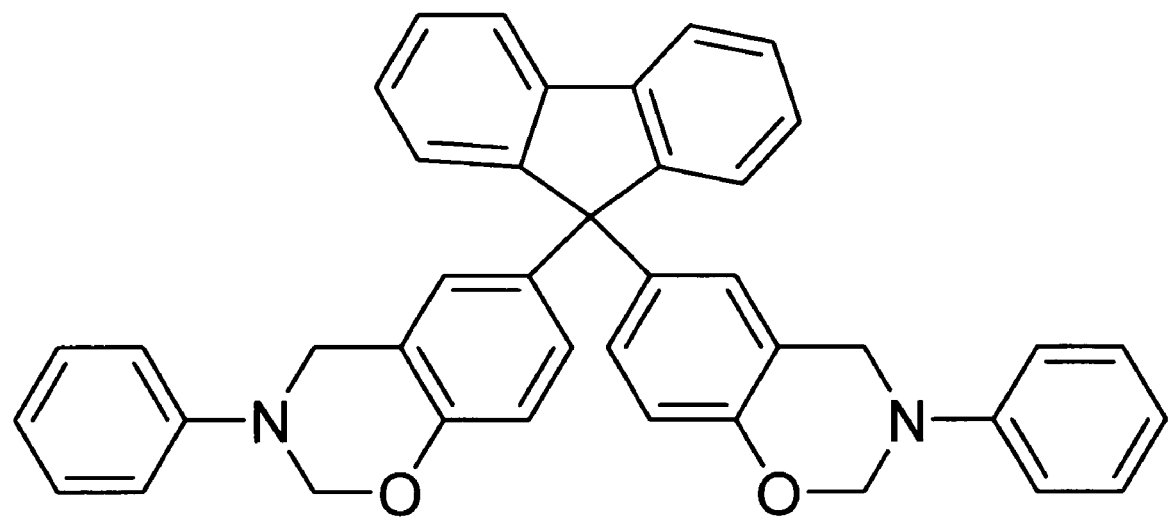
FIG. 20. depicts Example 12 regarding a benzoxazine.

Chemical Structures of Epoxies Used in Combination with Protected Phenolics and Benzoxazines The epoxies that were used in the compositions are shown in FIG. 20.

Example 17

Deprotection of Protected Phenolics in the Presence of Imidazoles, Results from DSC The deprotection of protected phenolics in the presence of imdazoles were evaluated using a TA instruments Q10 differential scanning calorimeter (DSC), in the temperature range of 25 to 300° C. with a temperature ramp of 5° C./min. Imidazole and protected phenolic are combined using the molar ratios of Table 1, are well mixed, and loaded into A1 pans. The results of the analysis are tabulated in Table 1.

TABLE 1

DSC results for compositions of protected phenolic (P), epoxies (E), and 2-ethyl-4-methylimidazole (Im)

| entry | protected phenolic (P) or epoxy (E) | mole P or E/ mole Im | $T_{peak}$ (exo, endo, ° C.) | heat (J/g) |
| --- | --- | --- | --- | --- |
| 1 | P2 | — | endo, 175 | — |
| 2 | E3 | 1/4 | exo, 101 | |
| 3 | P2 | 1/1 | exo, 97 | 350 |

The DSC trace of P2 alone showed an endothermic transition at 175° C., associated with decomposition of the compound. In contrast, when one mole equivalent of 1 m is added to P2, the DSC showed an exotherm at 97° C. and as expected occurs at approximately the same temperature as the addition product of E3 and 1 m.

Example 18

Deprotection of Protected Phenolics in the Presence of Imidazoles, Results from TGA The deprotection of protected phenolics in the presence of imidazoles was further evaluated using a TA instruments TGA 2850 thermal gravimetric analyzer (TGA), in the temperature range of 25 to 600° C., with a temperature ramp of 20° C./min.

TABLE 2

TGA results for compositions of protected phenolic (P) and 2-ethyl-4-methylimidizole (Im)

| entry | protected phenolic (P) or imidazole (Im) | mole P/ mole Im | onset temperature (° C.) | weight loss [% (w/w)] |
| --- | --- | --- | --- | --- |
| 1 | P2 | — | 200 | 100 |
| 2 | Im | — | 200 | 100 |
| 3 | P2 | 1/1 | 109 | 12 |

As Table 2 shows, P2 shows a loss of mass in the presence of imidazole at 109° C., about 90° C. lower in temperature than the onset of decomposition. The weight loss of 12% (w/w) is attributed to the loss of $CO_2$ resulting from the deprotection.

Taken together and without being bound by theory, the mechanism of deprotection results from imidazole initially forming an addition product with the oxirane moiety of P2, which is seen as at 97° C., followed by almost immediate loss of $CO_2$, at 109° C., thus producing the phenol and new epoxy adduct (Scheme 1).

Example 19

Deprotection of P2 in the Presence of Im Evaluated Using the Ferric Chloride Test and Thin Layer Chromatography (TLC)

A composition of a one to one molar ratio of P2 and 2-ethyl-4-methylimidazole is heated for two hours at 100° C. and then evaluated for the release of phenol using the ferric chloride test of Shriner et al., "The Systematic Identification of Organic Compounds"; 6th ed.; Wiley: New York, 1980; pp 348-350. As expected, a purple color was produced indicating formation of an iron complex and the presence of phenol. To further show the release of phenol, a sample of the aforementioned composition was analyzed by thin layer chromatography using a silica gel stationary phase and eluted with 1:1 weight ration if iso-propyl acetate and hexane. Comparison of the $R_f$ value [(distance traveled by the compound)/(distance traveled by the solvent front)] of the mixture relative to phenol also indicated the presence of phenol in the mixture.

Example 20

Compositions-Glycidyl Carbonates, Benzoxazine, Epoxies, and Imidazoles

Compositions 1 through 20 are prepared by thoroughly mixing the components according to the molar ratios as shown in Table 3.

TABLE 3

Compositions of protected phenolics (P), benzoxazines (B), epoxies (E), and 2-ethyl-4-methylimidazole (Im).

| composition # | protected phenolic (P) | benzoxazine (B) | epoxy (E) | molar ratio P:B:E:Im |
|---|---|---|---|---|
| 1 | P2 | | E1 | 1:0:1:0 |
| 2 | P2 | | E1 | 1:0:1:1 |
| 3 | P2 | | E2 | 1:0:1:1 |
| 4 | | B1 | | 0:1:0:0 |
| 5 | P2 | B1 | | 1:1:0:0 |
| 6 | P2 | B1 | | 1:1:0:1 |
| 7 | | B4 | | 0:1:0:0 |
| 8 | P2 | B4 | | 1.5:1:0:0 |
| 9 | P2 | B4 | | 1.5:1:0:1.5 |
| 10 | P2 | B1 | E1 | 1:1:1:0 |
| 11 | P2 | B1 | E1 | 1:1:1:1 |
| 12 | P3 | B2 | E2 | 1:1:1:0 |
| 13 | P3 | B2 | E2 | 1:1:1:2 |
| 14 | P3 | B3 | E2 | 1:1:1:2 |
| 15 | P3 | B3 | E3 | 2:2:1:4 |
| 16 | P4 | B3 | E3 | 2:2:1:4 |
| 17 | P5 | B3 | E3 | 2:2:1:4 |
| 18 | P6 | B3 | E3 | 4:6:3:12 |
| 19 | P7 | B6 | E3 | 1:1:1:1 |
| 20 | P8 | B7 | E3 | 1:1:1:1 |

Example 21

Compositions-Glycidyl Carbonates, Benzoxazine, Epoxies, and Micro-Encapsulated Deblocking Agent Compositions 21-26 are prepared by thoroughly mixing the components according to the molar ratios as shown in Table 4. The micro-encapsulated deblocking agent that is used is latent hardeners HX-3721 (LH1), HX-3741 (LH2), and HX-3748 (LH 3), respectively, which are obtained from Asahi Kasei Chemicals Corporation.

TABLE 4

Compositions of protected phenolics (P), benzoxazines (B), epoxies (E), and latent hardeners.

| composition # | protected phenolic (P) | benzoxazine (B) | epoxy (E) | latent hardener (LH) | weight ratio P:B:E:LH |
|---|---|---|---|---|---|
| 21 | P3 | B2 | E3 | LH1 | 1:1:1:1 |
| 22 | P3 | B2 | E3 | LH2 | 1:1:1:1 |
| 23 | P3 | B2 | E3 | LH3 | 1:1:1:1 |
| 24 | P7 | B6 | E3 | LH1 | 1:1:1:1 |
| 25 | P7 | B6 | E2 | LH2 | 1:1:1:1 |
| 26 | P7 | B6 | E2 | LH3 | 1:1:1:1 |
| 27 | P6 | B2 | E3 | LH1 | 0.5:1:1:1 |
| 28 | P6 | B2 | E3 | LH2 | 0.5:1:1:1 |
| 29 | P6 | B2 | E3 | LH3 | 0.5:1:1:1 |
| 30 | P8 | B7 | E3 | LH1 | 1:1:1:1 |
| 31 | P7 | B6 | E3 | LH2 | 1:1:1:1 |
| 32 | P8 | B7 | E3 | LH3 | 1:1:1:1 |

Example 22

Reaction Temperatures

Compositions of glycidyl carbonates, benzoxazine, epoxies, and imidazoles were prepared by thoroughly mixing of the components of Table 3. They were then loaded into Al DSC pans, loaded into the DSC, and while under a nitrogen atmosphere heated in the temperature range 25 to 325° C. using a heating ramp of 5° C./min. The results are shown in Table 4.

TABLE 4

DSC results for the compositions consisting of protected phenols, benzoxazine, epoxies, and imidazole

| composition # | $T_{peak}$ (endo, exo, ° C.) |
|---|---|
| 7 | exo, 224 |
| 8 | exo, 199 |

Comparisons of compositions 7 and 8 show the polymerization of benzoxazine is reduced by about 20° C. in the presence of a protected phenolic.

In one embodiment of the invention, the curable compositions described above are provided in cured form and included in manufactured products such as electronic components, electronic displays, circuit boards, flip chips, and semiconductor devices. In other embodiments, the compositions are provided in uncured or partially cured form to be used in these and other products before they are fully manufactured and assembled.

A person skilled in the art would undoubtedly recognize that other components and/or configurations may be utilized in the above-described embodiments. Moreover, all terms should be interpreted in the broadest possible manner consistent with the context. While the invention has been described in detail with regards to several embodiments, it should be appreciated that various modifications and/or variations may be made in the invention without departing from the scope or spirit of the invention. In this regard it is important to note that practicing the invention is not limited to the applications described hereinabove. Many other applications and/or alterations may be utilized provided that such other applications and/or alterations do not depart from the intended purpose of the invention. The ranges described in the specification, such as temperature or weight ranges, relate to embodiments of the invention, are not meant to limit the scope of the claims. Also, features illustrated or described as part of one embodiment can be used in another embodiment to provide yet another embodiment such that the features are not limited to the embodiments described hereinabove. Thus, it is intended that the invention cover all such embodiments and variations as long as such embodiments and variations come within the scope of the claims and their equivalents.

What is claimed is:

1. A composition comprising:
    a protected phenolic compound, where the protected phenolic compound comprises at least three aryl glycidyl carbonate moieties;
    an epoxy resin; and
    a microencapsulated deblocking agent.

2. The composition of claim 1, where the protected phenolic compound is selected from the list including the following aryl glycidyl carbonates:

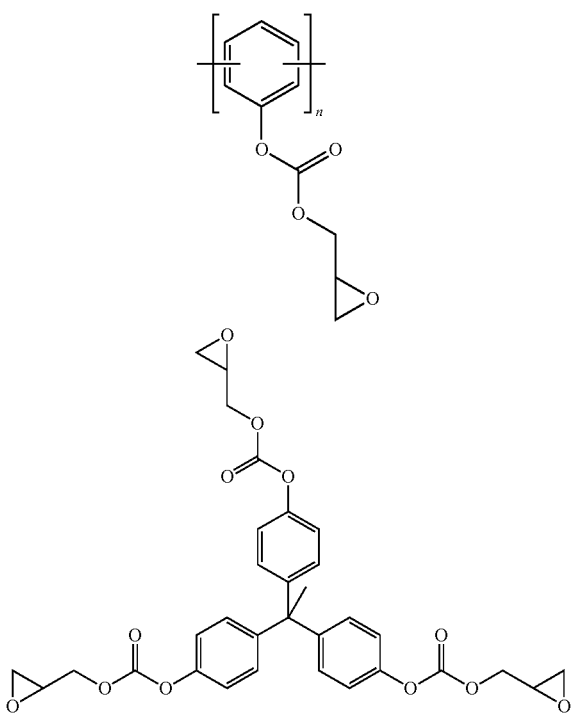

wherein n is at least 3.

3. The composition of claim 1, where the epoxy resin is derived from at least one of bisphenol A, bisphenol F, novolac, polyphenol, aniline, polyaniline, or their oligomeric or halogenated derivatives.

4. The composition of claim 1, comprising:
    0.1 to 90 percent by weight of the protected phenolic compound; and
    10 to 99.9 percent by weight of the epoxy resin.

5. The composition of claim 4, comprising 0.1 to 90 percent by weight of the deblocking agent.

6. The composition of claim 5, where the deblocking agent is an amine, imidazole, triazine, triazole or an imidazole-epoxy adduct.

7. The composition of claim 1, where the microencapsulated deblocking agent is encapsulated within a polymer shell.

8. The composition of claim 1, where the microencapsulated deblocking agent is encapsulated in a polymeric matrix.

9. The composition of claim 1, further comprising one or more elements selected from: curing agents and catalysts for epoxides, fillers, surfactants, coupling agents, pigments, dyes, and conducting particles.

10. A composition comprising: 0.1 to 90 percent by weight of a protected phenolic compound comprising at least three aryl glycidyl carbonate moieties selected from the following:

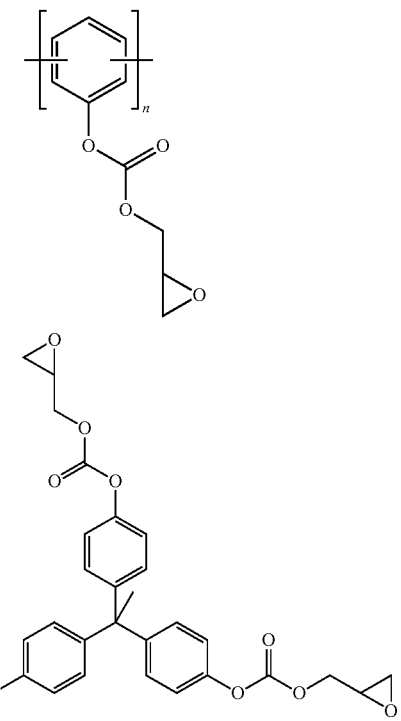

wherein n is at least 3

10 to 99.9 percent by weight of an epoxy resin derived from at least one of bisphenol A, bisphenol F, novolac, polyphenol, aniline, polyaniline, or their oligomeric or halogenated derivatives; and 0.1 to 90 percent by weight of a deblocking agent comprising an amine, imidazole, triazine, triazole or an imidazole-epoxy adduct, the deblocking agent being microencapsulated in a polymeric matrix.

11. The composition of claim 10, further comprising 0.1 to 90 weight percent benzoxazine selected from the list including the following benzoxazine compounds:

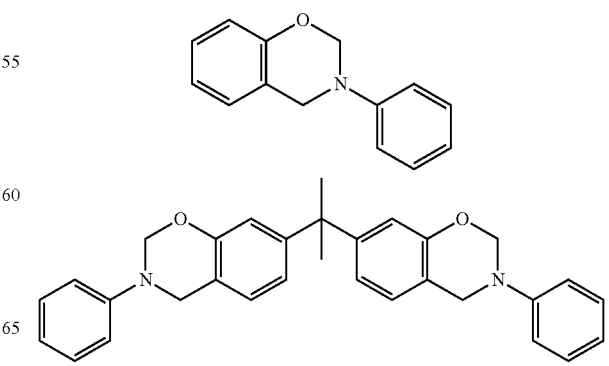

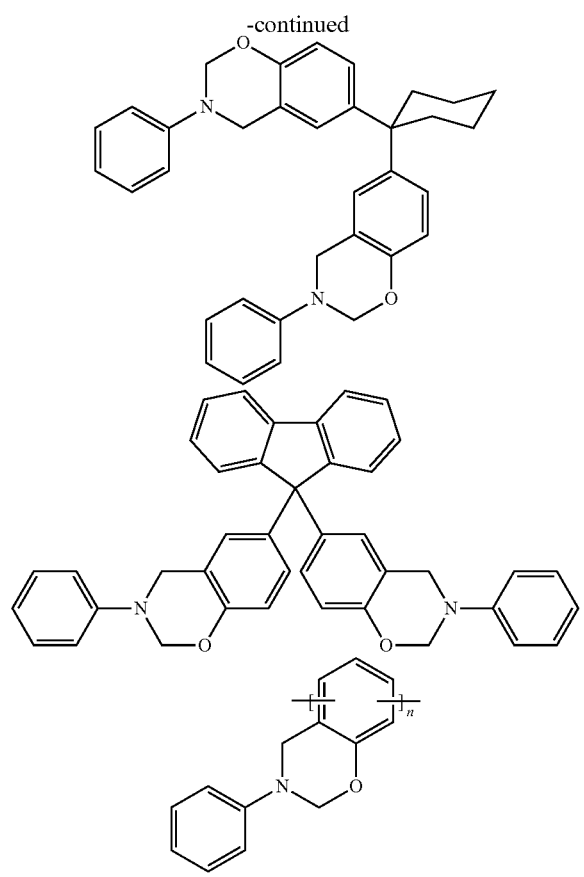

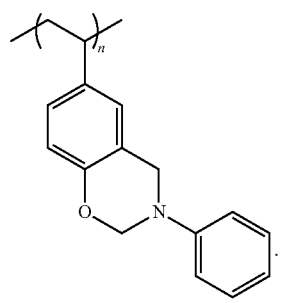

12. The composition of claim 11, where the composition is an adhesive, conducting adhesive, composite, molding compound, anisotropic conducting film (ACF) adhesive, non-random array ACF, non-conductive adhesive film (NCF), coating, encapsulant, underfill material, lead or free solder.

13. The composition of claim 11, where the composition is a 1-part adhesive composition having a substantially long shelf-life at storage conditions, and the composition is reactive at either the curing temperature or the molding temperature.

* * * * *